July 27, 1965   E. W. MAASS   3,197,532
PROCESS FOR MAKING SQUEEZE TUBE CONTAINERS
Filed April 4, 1963
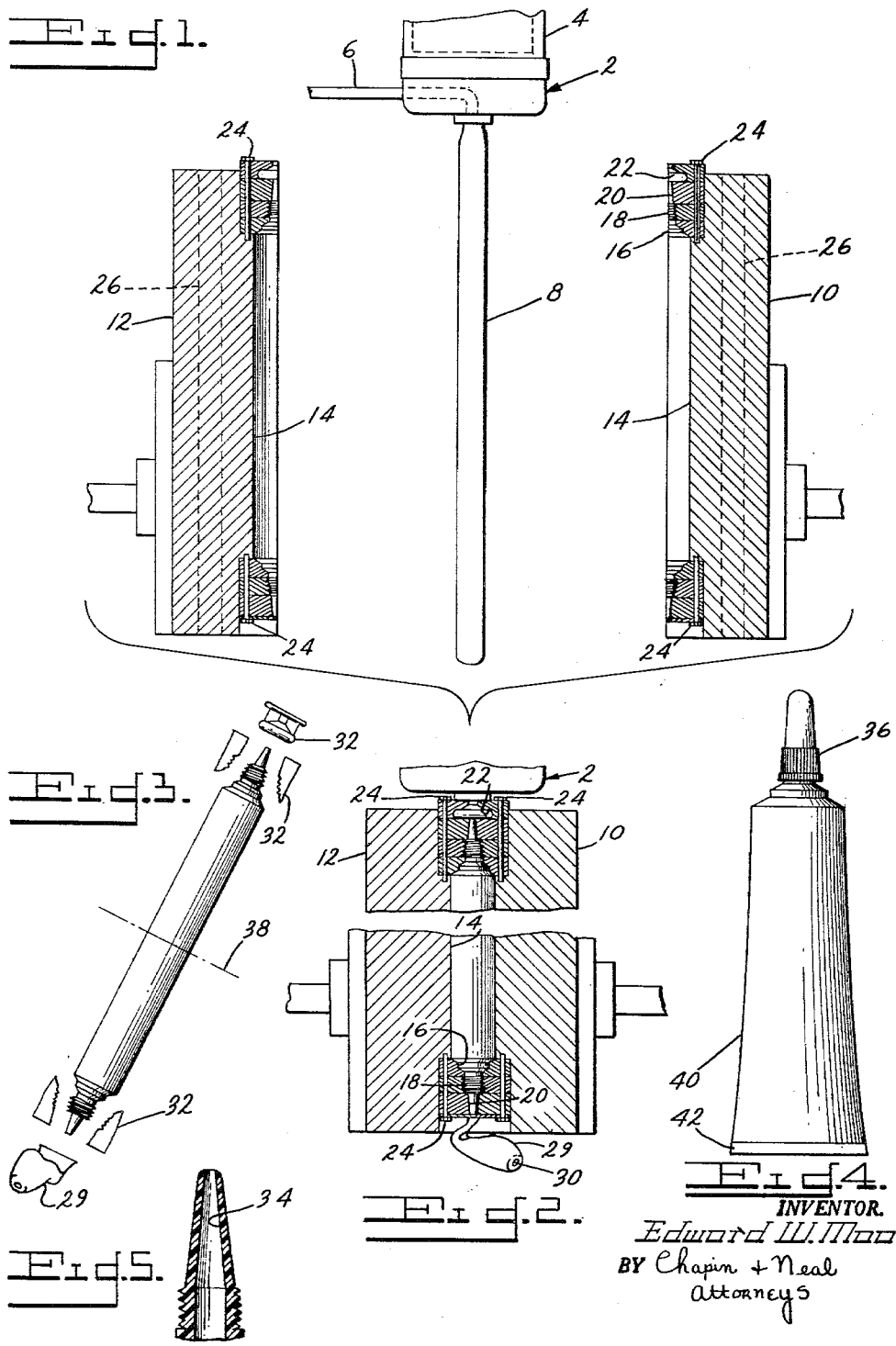
INVENTOR.
Edward W. Maass
BY Chapin + Neal
Attorneys

United States Patent Office 3,197,532
Patented July 27, 1965

3,197,532
PROCESS FOR MAKING SQUEEZE TUBE CONTAINERS
Edward W. Maass, Northampton, Mass., assignor to Tubed Chemicals Corporation, Easthampton, Mass., a corporation of Delaware
Filed Apr. 4, 1963, Ser. No. 271,047
6 Claims. (Cl. 264—98)

The present application is a continuation-in-part of application Serial No. 190,289, filed April 26, 1962, now abandoned.

This invention relates to the production of hollow articles such as collapsible or "squeeze" tube containers. These types of containers are commonly made from thermoplastic materials capable of being worked while heated to a softened condition at relatively low temperatures. When so heated and in tubular form the plastic material may be expanded under fluid pressure to form hollow articles of a desired shape and then cooled to a more or less self-sustaining form. The present invention relates to improvements in methods of making "squeeze" tubes by the blowing process and in particular tubes of this type which are desirably equipped with a restricted tip opening at the dispensing end.

In the prior art many techniques have been devised, and a wide variety of apparatus designed, for forming so-called plastic squeeze tubes by the blow molding method. In commercial usage such containers, insofar as I am aware, are conventionally made in molds having closed bottoms into which the fluid, as air under pressure, is introduced. The air is thus trapped entirely within the confined space of a molding zone and a closed bottom formed for the finished article. The neck structure of the finished container is also usually formed by the mold, and provided, if desired, with cap threading. This formation occurs at the inlet end of a mold, where the air under pressure is introduced. In most cases the opening is of sufficient size to readily fill the container and serves as the opening through which the contents are to be dispensed. However, where an extremely restricted opening for discharge of the contents is desired, containers made by the blow molding method necessitate cutting off the closed bottom so that the container lends itself to rapid filling operations consistent with economical handling.

It is a particular object of this invention to take advantage of the blow molding process and economically increase the production of squeeze tubes which desirably require an extremely small opening, such as an apertured "applicator" dispenser tip for making the contents available to the user.

These and other objects and advantages of the invention will be apparent from the following description of the invention as shown by the accompanying drawings in which, FIG. 1 is a vertical section through a fragmentary view of a blow mold die apparatus in open position and also showing a tube of extruded deformable plastic material suspended therebetween in position for closing the die halves;

FIG. 2 is a fragmentary view similar to FIG. 1 with the mold dies in closed condition;

FIG. 3 is a view of an article as produced by the apparatus of FIGS. 1 and 2;

FIG. 4 is a plan view of a finished tube container, filled and closed at the bottom; and FIG. 5 is a fragmentary detail section showing an applicator tip.

As a preliminary examination of the drawings will indicate, the invention contemplates the formation of a tubular article having an externally threaded dispenser tip at each end (FIG. 3). Each tip has an internal passage (FIG. 5) for squeezing and dispensing contents from a filled container sealed at the bottom (FIG. 4). The double ended tube of FIG. 3 thus serves, when cut in half, to provide a pair of tubular container bodies each of which may be filled through its open bottom and sealed in any conventional manner desired.

The method of this invention forms the above described intermediate article of manufacture in a single blow mold die assembly by introducing fluid, as air under pressure, at an inlet end of the mold and passing the air out through an outlet end without the aid of mandrels.

Insofar as I am aware, the nearest prior art is Patent No. 2,657,431 granted November 3, 1953, disclosing a method of blow molding a double ended article by mounting a plastic tube or parison in a deformable condition on a hollow mandrel having a wall perforated throughout its length. The mandrel is closed at the far end when the mold is closed. Air under pressure is delivered through the mandrel perforations to the parison interior, and conforms the plastic to the shape of the mold walls. The mandrel necessarily limits the degree to which it is possible to form extremely small dispenser openings. It is also difficult to taper the tip interior when this is desired for uniform discharge of contents from a tube.

Referring to FIG. 1, a tubing die 2 with blow mold air tube 6 is at the underside of a conventional extruder 4. Suspended from die 2 a parison 8 of plastic material is shown positioned between identically formed die halves 10 and 12 of the mold apparatus.

The tube 8 of heated deformable plastic material may be extruded from any conventional apparatus known in the art. The organic plastic material itself may vary widely. Polyethylene has been used in actual practice of the invention. Any of the commonly known thermoplastics used in blow molding can also be utilized. Cellulose acetate, polyvinyl materials, nylon resins are but a few of the examples of resinous and thermoplastic compositions which can be extruded in continuous lengths for blow molding according to the present invention.

When the tube 8 is extruded to a length slightly greater than the length of the double tube and tips of mold die halves 10 and 12, the extrusion is stopped and the mold closed by bringing the die halves into the relative position shown by FIG. 2.

Each of the die halves is identically formed with a cavity 14 for the main body of the tubes. At the top and bottom ends a die insert is provided with identically formed die portions as may be suitable. In the example shown an inner shoulder die is at 16, a thread die at 18, and a tip die at 20. Additionally, at the top where inlet air is introduced from tube 6 an air chamber block 22 is provided. The chamber is supplied to prevent a venturi effect in the insert die area which would otherwise collapse the tube during the forming operation. The insert assemblies may be secured by holding pins 24 as shown. Cooling passages through each of the mold halves are indicated at 26.

Immediately on closing the mold, tube 6 introduces air under pressure to the interior of deformable parison 8, thus blowing the walls into intimate contact with the mold surfaces as in FIG. 2. The plastic in the bottom insert area remains in soft deformable condition at least in the interior parison wall portions even though the insert walls immediately on closing begin to chill the outer contacting parison surfaces. With inner walls in a fluid state air under pressure is able to pass through to the die exit. In actuality the interior passage of the parison in this area may collapse and close momentarily. In this event the softer core of a collapsed parison is immediately pushed through to form a tapered outlet passage. The pressure and velocity of air is sufficient either to maintain or, as explained, to clear the passage and keep it open. A globule of plastic 29 at the lower end of the die has an outlet hole shown at 30. Such a globule may take various indeterminate shapes depending on factors of wall thickness etc. as will be readily appreciated. In any event hole 30 at the end of the parison length remains open as an exit for air forced through the restricted passage of the die.

From FIG. 3 it will be seen that globule 29 and parting line flashing pieces 32 may be readily trimmed. FIG. 5 shows a finished tip in cross section.

In FIG. 5 the tapered applicator tip dispenser opening 34 is best seen in "finished" condition and adapted to receive a standard type of screw cap 36 such as shown on the filled tube 40 of FIG. 4. The tube of FIG. 4 is, of course, produced from the double tip ended article of FIG. 3 by cutting at the severance line 38, capping, filling from the cut end, and sealing as at 42 (FIG. 4), the filling and sealing operations being conventional.

In conventional blow molding the volume and pressure of air is relatively low, for example in the case of an eight ounce tube having a closed bottom, pressure is on the order of 15–25 p.s.i. It has been found, however, that where the far end of the mold is kept open to atmosphere more air is required and at substantially greater pressures. In the example shown in the drawings, wherein FIG. 4 shows an actual size of tube, the restricted applicator tip passages illustrated can be formed only by opening the lower end to atmosphere during the forming cycle. In the example shown the total container volume of the two tubes, back to back as in FIG. 3, is approximately an ounce. Desired pressures may vary from 130 to 50 or 60 p.s.i. depending on size of tip passage and other well recognized factors. Air pressure levels can remain constant, or, be cut from an initial high during a full cycle as may be most expedient.

It has also been found in practicing this invention that extremely thin walled containers can be produced successfully. Whereas polyethylene squeeze tubes are generally formed on the order of 10–15 thousandths of an inch in conventional blow molding, thin walls on the order of 5 or 6 thousandths of an inch may be produced by the present invention.

Furthermore, tapered applicator dispenser tips such as shown in the enlarged view of FIG. 5 can be successfully formed at each end of the mold with extremely restricted orifice openings. As an example an orifice opening as at 34 (FIG. 5) has been made having an internal diameter at the extreme end of the tip of .005 inch.

Thus by the method of blowing through a blow mold die and forming dispenser tip dies at each end the production of squeeze tubes is made with simpler equipment and more economically. While in the specific example shown herein fluid is admitted at one tip end and is passed out the other tip end, it will be readily apparent to those skilled in the blow mold art that fluid pressure may be admitted in the center of the tube cavity (which portion would be removed when the tubes are cut apart) and the fluid allowed to pass to atmosphere from both ends so as to form the two apertured tips. The resultant product of the invention is an improved product from the standpoint of a more uniform wall thickness from the tip to the closed end in comparison with present commercial methods of forming the tube body and the tip separately and welding the two together. Production is increased as against a blow molding operation to obtain a closed bottom tube and then snipping off the bottom for the filling operation. And extremely restricted orifice openings are obtainable for use as applicator dispenser tips for squeeze tubes. Of course, the tips at each end of the mold need not be duplicates as shown.

In blowing air into the mold cavity and out the end it should also be noted that many sizes of tubes can be made with an orifice of appropriate size without the need for any subsequent drilling or machining operations and also without the need of elaborate introduction of controlled internal mandrels at one or both ends of the tube.

Another important feature of the present method in contrast to ordinary blow molding of tubes with integral neck portions lies in the previously mentioned ability to make an improved product from the standpoint of a more uniform wall thickness. This can readily be seen in contrast to the usual commercial practices used in forming tube bodies and tips separately and then joining the two. It is also true when compared to ordinary blow molding procedures where the neck and body are integrally molded in a closed cavity. In the closed cavity the end thrust of air on the portion of the plastic which is to form the bottom inevitably pulls down the side walls and thus is apt to borrow plastic wall material next to the corner where the side and the bottom of a bottle normally join each other. Thus, there is a tendency for side walls to be uneven in thickness and there is as well a tendency to form variable strain lines which may open up danger points for what is known as stress cracking. In contrast, the tube of molten plastic in the present method (see FIG. 1) will be drawn in at the bottom with air still going through it sufficiently to keep it from closing off at the bottom. Thus air pressure uniformly expands the tube sideways against the outer edges of the mold so that a fairly uniform wall thickness for the entire length of the tubes is accomplished.

A further advantage obtainable by the present method is found in making tubes of the larger dispenser orifice sizes. This will be appreciated from the fact that where larger openings are too big to be formed with the desired uniformity by air alone, a smaller opening can be made and subsequently used as a pilot hole for subsequent drilling operations. For the most part, however, the use of air pressure can be controlled so as to eliminate any need for drilling.

While the invention has been described and exemplified in connection with tubes of cylindrical form, it will be appreciated that oval tubes, tapered tubes and tubes having other configurations can also be readily formed.

It will also be appreciated that where the parison dimensions (diameter and wall thickness) are related to the length and minimum diameter of an applicator tip die insert area so as to avoid closing off passage of air therethrough, it is feasible to form die cavities in tandem similar to that shown—particularly with shorter tube body lengths. In other words, another die cavity with die inserts at each end might be formed in a die block in end to end relationship below the lower insert 24 of FIGS. 1 and 2, the abutting insert openings being joined for passing air under pressure through the entire length of the mold and passing through the bottom to atmosphere. The number of body cavities which may be joined to form a plurality of articles is limited only by the restrictions relative to the ability to maintain a required amount of pressure throughout the molding zone or zones.

Having thus described the invention, what is claimed as novel and desired to be secured by Letters Patent of the United States is:

1. The process of producing hollow tubular dispenser tipped containers in an open-ended blow molding zone which comprises extruding a thermoplastic tube member in softened condition while freely suspending the same, then closing blow mold dies about said tube and immediately introducing fluid under pressure to the interior of said tube member and then next while maintaining fluid pressure conditions in the interior of the tube simultaneously conducting said fluid under pressure through both ends of the mold in direct contact with the plastic material at said ends during expansion of said member in said open-ended molding zone.

2. The process of producing hollow tubular dispenser tipped containers in an open-ended blow molding zone which comprises extruding a thermoplastic tube member in softened condition while freely suspending the same, then closing blow mold dies about said tube and immediately introducing fluid under pressure into the interior of said tube by passing said fluid through one of said dispenser tipped ends thereof and passing the fluid out the other tipped end, the passage of fluid under pressure through each said tipped end being effected in direct contact with the plastic material at said tipped ends.

3. In the manufacture of hollow articles by extruding a tubular heat deformable member of thermoplastic material, enclosing said member in a mold forming zone, and subjecting the member to internal fluid pressure to form the same; the process of making a pair of dispenser tipped hollow articles back to back in a single molding zone which comprises introducing fluid under pressure into the deformable member at one end and to and through the other end thereof with said fluid under pressure being directly in contact with the interior wall surfaces of said material at each dispenser tip end area of said molding zone and forming such member in said zone during the molding operation while continuing the passage of fluid under pressure through said tip end areas until the member is set to the mold form.

4. The process of claim 3 in which the fluid under pressure is introduced and conducted through tapered restricted orifice inlet and exit openings thereby forming a tapered dispenser tip passage for each half of said formed member.

5. The method of making hollow articles of organic plastic material which comprises extruding a tubular form of such material in heated deformable condition, confining said form within the walls of a molding zone having restricted passages for entrance and exit of air to and from the interior of said tubular form, and introducing air under pressure in direct contact with the plastic material in the area of said restricted passages sufficiently to expand said plastic tube to conform to said molding zone walls between said restricted passages and to maintain a passage of air through said restricted entrance and exit passages until the expanded plastic is set.

6. The method of making hollow articles of thermoplastic material which comprises extruding a tube form of such material in soft deformable condition, enclosing said form in a blow molding die having applicator tube dispenser tips formed at each end thereof, and introducing air under pressure at one end and passing said air from the other in sufficient volume and pressure to expand said form into intimate contact with the walls of the blow mold die for maintaining said air pressure and passage of air therethrough until the material of the plastic is set into self sustaining condition, said air under pressure being in direct contact with the interior walls of said tube from one tip end to the other and forming the orifice openings of each applicator.

References Cited by the Examiner

UNITED STATES PATENTS

| 2,657,431 | 11/53 | Slaughter | 264—99 |
| 2,792,593 | 5/57 | Hardgrove | 18—5 |
| 2,903,740 | 9/59 | Parfrey | 18—5 |

FOREIGN PATENTS

| 1,208,633 | 9/59 | France. |
| 1,220,563 | 1/60 | France. |

ROBERT F. WHITE, *Primary Examiner.*